May 12, 1925. 1,537,145
H. E. SHENTON
RELIEF VALVE
Filed Jan. 12, 1923
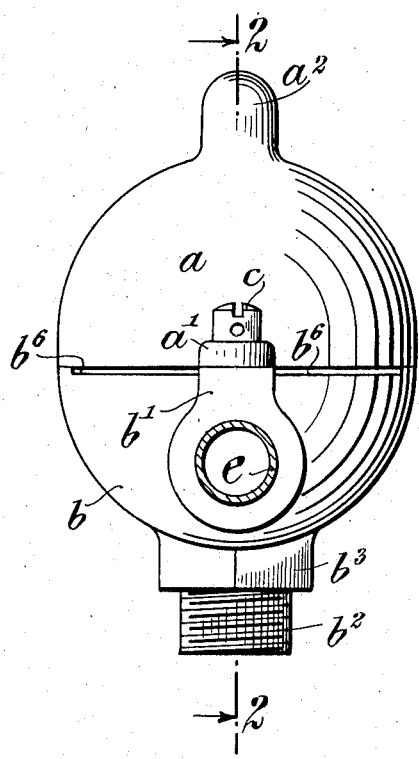
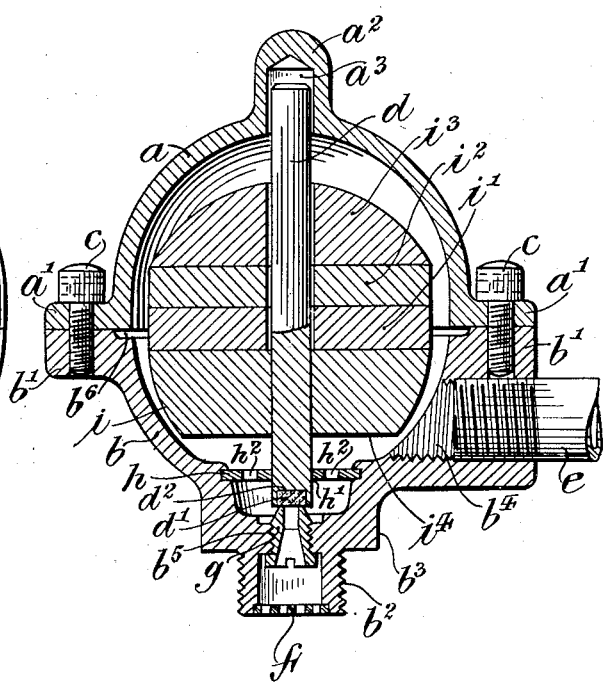
Inventor
Harry E. Shenton
By his Attorneys
Redding, Greeley, O'Shea Campbell

Patented May 12, 1925.

1,537,145

UNITED STATES PATENT OFFICE.

HARRY EDWARD SHENTON, OF PHILADELPHIA, PENNSYLVANIA, ASSIGNOR TO NEPTUNE METER COMPANY, OF NEW YORK, N. Y., A CORPORATION OF NEW JERSEY.

RELIEF VALVE.

Application filed January 12, 1923. Serial No. 612,297.

*To all whom it may concern:*

Be it known that I, HARRY EDWARD SHENTON, a citizen of the United States, and a resident of the city of Philadelphia, in the State of Pennsylvania, have invented certain new and useful Improvements in Relief Valves, of which the following is a specification, reference being had to the accompanying drawing forming a part hereof.

The relief valve which is the subject of the present invention has been designed with special reference to its use in connection with domestic water heating plants, its purpose being to provide automatic relief for the water heating system if the pressure within the system increases above a predetermined limit, as sometimes happens if the normal return is choked in any way or if the heat is carried too high. Such systems are usually connected to the supply line through a meter which must be protected against excessive back pressure or through a check valve which prevents relief of excessive pressure into the supply line. Such relief valves should be widely used and if so would be installed oftentimes by mechanics of ordinary skill. Moreover when once installed they are not ordinarily subject to the supervision of competent persons. They should be, therefore, as far as possible, fool-proof. Because of their wide distribution and frequent handling in transportation and installation they should be free from projecting parts liable to be broken off and all of their working parts should be completely encased and protected against possible injury by breakage. Once installed such relief valves should be capable of continuing in use for an indefinite period of time and they should therefore be as free as possible from liability to injury by corrosion. Heretofore relief valves intended for such use, have been more or less complicated in construction, usually embodying springs and levers, which are particularly liable to be rendered inoperative by corrosion or displacement, they have required the incorporation of adjusting devices, and their working parts have been more or less exposed and therefore liable to injury in handling and from other causes. It has been the purpose of this invention to provide a relief valve, particularly adapted for the use described, which shall be exceedingly simple in construction, embodying a minimum of parts, requiring the use of no adjusting devices when once installed, certain in operation even after long continued use, and having no exposed working parts or other parts liable to be broken. In accordance with the invention the valve is a direct weight-controlled valve, with all parts enclosed within a protective casing to which the supply line and the return line are directly connected. Various features of the invention will be more particularly referred to hereinafter with reference to the accompanying drawing in which the invention is illustrated and in which—

Figure 1 is a view in elevation of the improved relief valve, the return pipe being shown in section.

Figure 2 is a view in vertical section on the plane indicated by the broken line 2—2 of Figure 1.

The casing of the valve, approximately spherical in form, consists of an upper member $a$ and a lower member $b$, such members being provided with lugs $a'$ and $b'$ for the reception of screws $c$ by which the two members can be secured together. The upper member has an axial boss $a^2$ which is bored, as at $a^3$, to form a guide for one end of a valve stem $d$. The lower member $b$ has a threaded projection $b^2$ for engagement with the supply pipe and a wrench grip $b^3$. One of the lugs $b'$ is enlarged and threaded internally as at $b^4$, for engagement with the return or overflow pipe $e$. At its extremity the threaded projection $b^2$ receives a strainer $f$ and the bore of the projection is reduced and threaded as at $b^5$ to receive the bored valve seat $g$ of Monel metal, formed with a narrow edge for coaction with the valve body $d'$, preferably of soft rubber, seated in a recess $d^2$ formed in the end of the valve stem $d$, preferably also of Monel metal. A guide plate $h$ is seated in the lower part of the chamber within the lower member $b$ and is provided with a central opening, as at $h'$, to form a guide for the lower end of the valve stem $d$ and with other openings $h^2$ distributed about the central opening, to direct the inflowing streams of water, when the valve is unseated, against the weight $i$, preferably of lead, which is fixed upon the valve stem $d$. Other weights $i'$, $i^2$ and $i^3$ may be slipped loosely upon the valve stem $d$, to rest upon the weight member $i$, for the purpose of regulating the weight with which the valve is held to its seat and therefore determining pressure at which the valve will be unseated. The pressure of the liquid which unseats the valve is exerted directly against the valve body $d'$ in the lower end of the valve stem $d$ through the cored valve seat $g$ and when the valve has been thus unseated the continued flow of liquid is directed upward through the holes $h^2$ in the guide plate $h$ against the flattened under side $i^4$ of the weight member $i$, thereby assisting in holding the valve from its seat and preventing chattering.

The return or waste pipe $e$ may be connected into the supply line or elsewhere as may be desired and in order to guard against the possible failure to operate if the return or waste pipe $e$ should be choked in any way, shallow slots are formed, as at $b^6$, in one or the other of the meeting faces of the two casing members $a$, $b$ above the level of the waste pipe so that liquid may escape through the openings so provided directly from the interior of the casing. If the waste pipe is not obstructed such water as enters the casing flows off through the waste pipe without falling upon the floor. The slots are an added safeguard.

It will be understood that the valve stem $d$, with its weight member $i$, is first assembled with the lower part $b$ of the casing and that the upper part $a$ is then placed in position and secured by the screws $c$. Weight members $i'$, $i^2$ and $i^3$ are applied to the valve stem before the upper member $a$ of the casing is put in place, the number of such weight members employed being suited to the pressure at which it is desired that the valve shall unseat.

It will be observed that all of the working parts of the valve are completely enclosed, that the weight by which the valve is held to its seat is applied directly to the valve stem, that there are no springs to lose their tension in long use and become ineffective, that there are no levers to become corroded on their bearings and that the casing is of such shape and free from projections that there is no liability to injury in transportation or handling.

I claim as my invention:

A relief valve comprising a substantially spherical two-part casing, divided horizontally at its middle, the lower part adapted to be connected to the supply line and provided with a waste outlet and a guide for the valve stem and the other part provided with a guide for the valve stem, one of said parts being formed in its edge with shallow relief slots, a valve seat carried by the casing, a valve stem guided with the casing for co-operation with the valve seat, and a weight applied directly to the valve stem.

This specification signed this 6th day of January A. D. 1923.

HARRY EDWARD SHENTON.